(No Model.)
E. POWELL.
MACHINE FOR SAWING HOOP POLES.
No. 335,090. Patented Jan. 26, 1886.
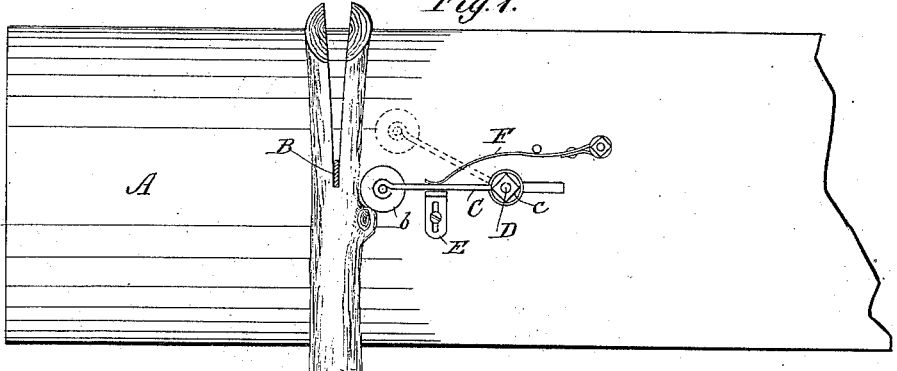
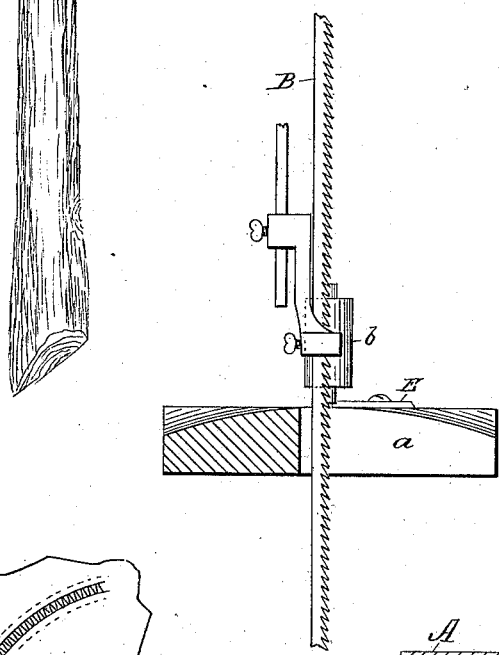
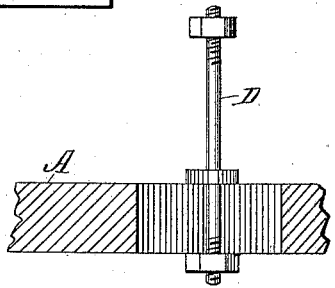
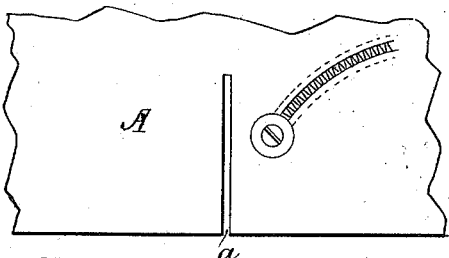
WITNESSES:
W. W. Hollingsworth
P. B. Turpin.
INVENTOR:
Edwin Powell
BY Munn & Co
ATTORNEYS.

UNITED STATES PATENT OFFICE.

EDWIN POWELL, OF WILLIAMSPORT, PENNSYLVANIA.

MACHINE FOR SAWING HOOP-POLES.

SPECIFICATION forming part of Letters Patent No. 335,090, dated January 26, 1886.

Application filed September 30, 1885. Serial No. 178,675. (No model.)

*To all whom it may concern:*

Be it known that I, EDWIN POWELL, of Williamsport, in the county of Lycoming and State of Pennsylvania, have invented a new and useful Improvement in Machines for Sawing Hoop-Poles, of which the following is a description.

My invention is an improved machine for sawing hoop-poles; and it has for an object to provide a machine in which crooked or bent and straight poles may be cut with equal facility.

It has for a further object to provide a simple and durable gage which will be rigid in a line at right angles to the saw or cutter, and will move freely therefrom in the arc of a circle.

In the drawings, Figure 1 is a plan view of my improved machine with a hoop-pole and indicated motions. Fig. 2 is a cross-sectional view thereof through the saw-opening. Fig. 3 is a detail view of a modification, and Fig. 4 shows the gage-arm support.

The table A, of which only the top is shown, has an opening, $a$, for the saw. This opening is usually located centrally between the front and rear sides of the table. The table, on opposite sides of the opening $a$, is curved downwardly to its front and rear edges, as shown most clearly in Fig. 2. By this downward curvature of the surface of the table on opposite sides of the saw, I provide a firm, constant bearing for the hoop under the saw or at the point of contact or cutting, and permit crooked or bent hoops to be passed readily through the machine. The advantages of this construction can be best understood by a reference to the hoop-sawing machine now in use. This machine employs a flat table, and when the hoop is bent or crooked and an upwardly-arched portion gets under the saw, the saw will be broken by the rebound of the hoop after it has forced such hoop down in its cutting action. By my form of table the hoop may rest flat thereon at the point of sawing, whether it be bent or straight, and any pole at all suitable for hoop purposes may be cut as easily as a perfectly straight one.

The saw B may be a jig or a band saw, as desired, and manifestly any other suitable form of cutter might be employed instead of a saw without departing from the broad principles of my invention.

In hoop-sawing machines some construction of gage or guide is employed to regulate the thickness of the hoop or splint being cut from the pole. In my invention I employ a gage-arm, C, pivoted at one end, $c$, to the table or other support, and having its other end adjacent the saw movable away therefrom in the arc of a circle. At the same time, it will be seen, the gage-arm is rigid against any movement or adjustment in a line at right angles to the saw. It is preferred to provide the swinging end of the arm with a roller, $b$; but such roller may be omitted and any other suitable bearing-surface be supplied, or the end of the arm be left plain to engage the side of the hoop. In the present instance the end of the arm opposite its bearing is pivoted to a support, D, which is preferably secured, by screws or otherwise, to the table so it may be adjusted in a line lateral to the saw, in order that the bearing of the gage may be adjusted to or from the pole, in order to cut hoops or splints of different thicknesses. In front of the gage-arm, at or near its bearing end, I provide a stop, E, and a spring, F, arranged to bear against the rear side of and press the gage-arm normally against the stop. This stop may be secured immovably to the table, but is preferably adjustable, substantially as shown, so the device may be adjusted to wide or narrow saws and with relation to the teeth thereof.

It will be understood that instead of a spring, as shown, a weight might be arranged and connected with the arm in such manner as to give the latter a normal tension against the stop. It will be further understood that the arm might be fixed rigidly at its rear end to the table or other support, and be formed of spring metal or other elastic material, so its forward or bearing end may move back from the saw in approximately the arc of a circle.

It will be understood that, instead of the arm carrying the bearing, the arm might be dispensed with without departing from the broad principles of my invention. In carrying out such a modification the bearing may be a roller or similar construction, and may be supported in curved guides, as shown, one above and below or only one below, as will be understood from Fig. 3. A spring is located in such guide in rear of the bearing. While such a construction would be within the scope of my invention, I prefer to employ a gage-arm and to pivot said arm and arrange the spring therefor substantially as shown and before described. The object in this rearward movement of the arm is, as will be understood, to permit knots or warts to pass the guide or gage by pressing the latter back. At the same time the gage will so press on the pole as to keep it in proper line for cutting the hoop straight and evenly.

Having thus described my invention, what I claim as new is—

1. A hoop-sawing machine comprising a table or support, a saw, and a gage arranged alongside of and laterally to the saw, said gage being rigid in a direction at right angles to the direction of movement of the pole being cut, substantially as described, whereby movement of the pole at right angles to its direction of longitudinal movement is prevented, and said gage being movable in an arc from the saw rearwardly with reference to the line of movement of said pole, substantially as set forth.

2. In a hoop-sawing machine, the combination of the table or support, the saw, the gage-arm having one end pivoted to the support in a line laterally to the saw and at right angles to the direction of the hoop-pole, and a stop, whereby said arm is held with its bearing end in line between its pivot and the saw, whereby said guide will, in its normal position, be rigid in a direction at right angles to the direction of movement of the hoop-pole, substantially as set forth.

3. In a hoop-sawing machine, the combination of the table or support having an elongated slot, the saw, the bolt D, having a fixed collar between its ends, and its lower end passed through the slot of the table and secured, the guide having one end pivoted on the upper end of the bolt, and a spring engaging said bolt, substantially as set forth.

4. In a hoop-sawing machine, the combination of the table or support, having an opening for the saw, and the saw operating through said opening, said table having its upper face curved transversely and downward on opposite sides from said opening, substantially as set forth.

EDWIN POWELL.

Witnesses:
P. B. TURPIN,
SOLON C. KEMON.